March 21, 1944.  G. E. HULSE, JR  2,344,614
BATTERY SEPARATOR
Filed June 25, 1940
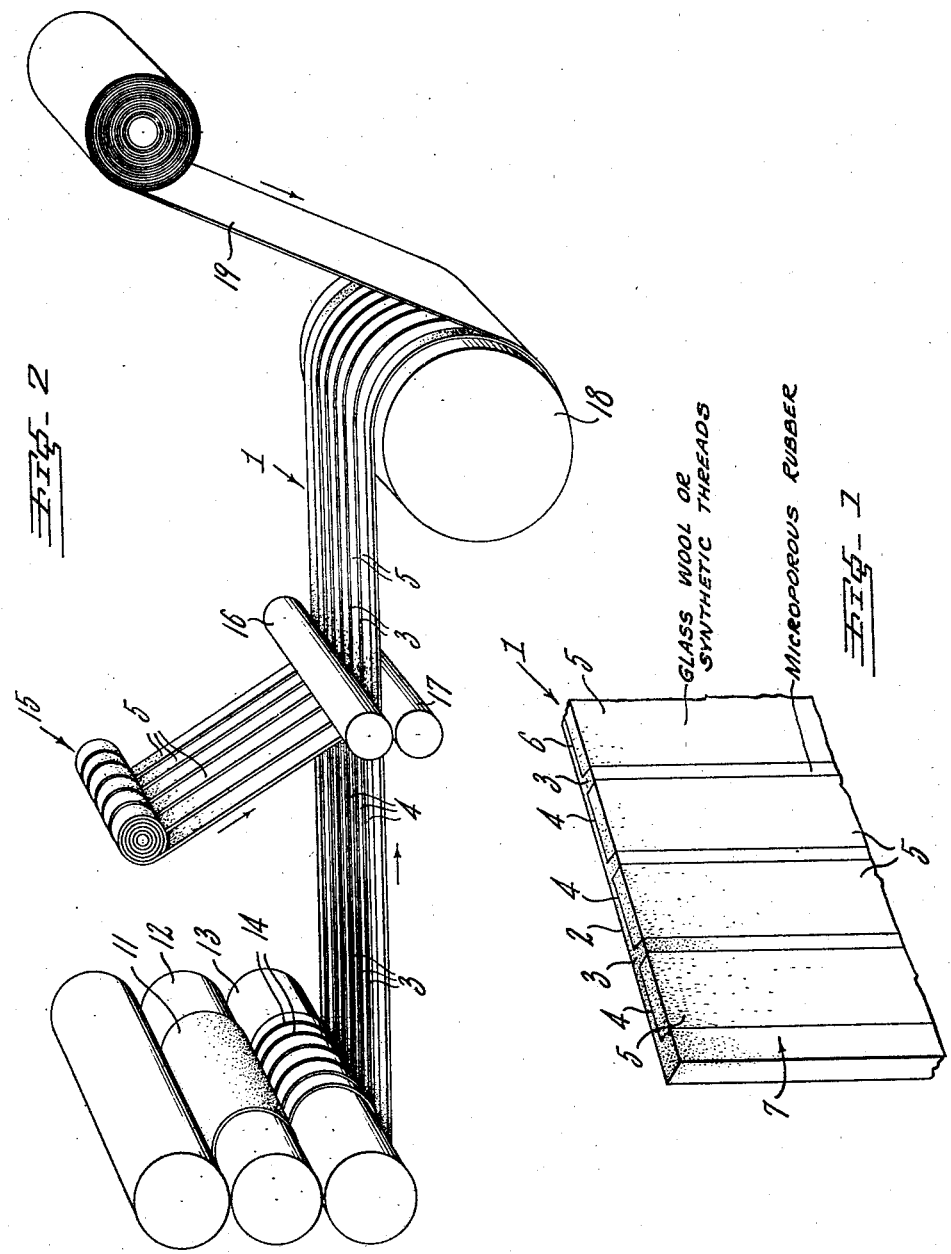
INVENTOR.
GEORGE E. HULSE, JR.
BY
ATTORNEY Patented Mar. 21, 1944

2,344,614

UNITED STATES PATENT OFFICE 2,344,614

BATTERY SEPARATOR

George E. Hulse, Jr., Passaic, N. J., assignor to United States Rubber Company, New York, N. Y., a corporation of New Jersey Application June 25, 1940, Serial No. 342,197

4 Claims. (Cl. 136—145)

This invention relates to battery separators, and more particularly to composite battery separators and paste retaining elements.

Various battery constructions have been suggested to insure positive retention of the active paste in the positive plates, and for likewise providing sufficient porosity for circulation of the electrolyte between the positive and negative plates. For example, it has been suggested to provide a plurality of cylindrical lead rods surrounded by slotted tubes of hard rubber with an intermediate mat interposed therebetween to retain positive active paste. This construction has high internal resistance and the cost is such that its applications are materially limited. Another well-known construction, used in ordinary automotive storage battery constructions, employs the usual wooden battery separator between the positive and negative plates together with an additional inserted layer of glass fibers held against the active material in the positive plate by the tightly fitting relationship of the plates and separators within the battery casing. It has also been proposed to provide a battery separator which consists of a plurality of plies of glass wool, but in this construction it is necessary that the wool in the different plies be of different finenesses in order to achieve the desired porosity.

The present invention provides a composite unit which serves both as a plate separator and as a battery paste-retaining element, for the type of automotive-type storage battery in which a series of flat positive and negative plates alternate across the battery casing. The separator according to the invention comprises a sheet of acid-resisting and oxidation-resisting plastic material such as microporous hard rubber having ribs and grooves on at least one surface thereof, with fibrous material such as glass fibers or glass fabric applied to the face of the plastic material only in the grooves. The fibers preferably just fill the grooves so that both faces of the separator are planar, and the fibers are bonded or adhered to the plastic material to form a unitary integral separator and paste-retaining element.

The present separator overcomes a number of disadvantages found in previous constructions, for example, a more positive direct support is imparted to the active paste material by the substantially planar surface of the present separator than with previous separators which had unfilled grooves which permitted dislocation of the active material, which, in turn, caused an accumulation of active material at the bottom of the cell resulting in short-circuits. The microporous hard rubber permits adequate flow of electrolyte and the mass of glass fibers, being more porous than the rubber, provides for free circulation of electrolyte along the surface of the plate. The integral strips of glass fibers permit readier escape of gas bubbles from the surface of the battery plate than does an all-rubber battery separator. Economy is effected by a reduction in the quantity of glass fibrous material used per separator. The hard-rubber provides a stiff backing for the glass fiber paste retaining material. The composite assembly provides ease of handling, ease of assembling and reduces the well-known dangers to the operators as compared with handling sheets of glass wool or glass fibers.

In some batteries certain chemicals are used which maintain the capacity of the negative plate but which tend to cause gradual expansion thereof. With previous constructions embodying a continuous sheet of glass fibrous material, the porosity thereof was considerably reduced by this expansion. The present construction overcomes this previous disadvantage by the presence of the ribs of hard rubber which serve to resist the expansion of the negative plate.

The accompanying drawing illustrates a present preferred embodiment of the invention, in which:

Fig. 1 is a fragmentary perspective view of the battery separator; and

Fig. 2 is a diagrammatic view of a continuous method for making the composite battery separators.

Referring to Fig. 1, the separator 1 includes a supporting element comprising a flat grooved sheet of porous material such as microporous rubber. One face 2 of the separator is planar and is entirely of microporous rubber. The opposite face of the porous sheet has upstanding projections 3 shown in the drawing as parallel longitudinal ribs. These projections may, if desired, be of other configurations; and between the projections 3 are grooves 4 which are filled with strips 5 of porous acid-resistant fibrous material such as glass fibers, glass wool or glass fabric. A bonding agent 6 such as a vulcanizable rubber adhesive or sodium silicate adhesive serves to retain the fibrous material in proper position within the grooves. The composite face 7, opposite the face 2, is substantially planar and comprises alternate portions of microporous rubber and of fibrous material. The projections 3 in the composite face thus provide spacers or compression elements which extend from the positive plates to each adjacent negative plate of an assembled battery and prevent the fibrous material 5 from being compressed by expansion of the negative plate. If it is desired to provide projections of other configurations, the projections are preferably all of the same height and are so positioned as to provide spaces therebetween for the insertion and anchorage of the fibrous material. In ordinary practice, the face 2 of the separator may lie adjacent the negative plate of the battery and the face 7 is in contact with the positive plate. It is preferable that the ribs 3 be of sufficient height and thickness to provide strength for the composite sheet, and at the same time that the fibrous insert strips 5 be wide enough to present a substantial glass face to the positive plate. In the drawing, the relative width of the rib to the fibrous strip is shown as approximately 1:5 although the ribs and strips may, if desired, be of equal width.

The separators may be continuously formed as follows. Referring to Fig. 2, a continuous sheet 11 of unvulcanized microporous rubber is calendered between a smooth roll 12 and a patterned roll 13 having circumferential grooves 14 to form ribs or projections 3 on the upper surface of the sheet. A supply roll 15 carries a number of strips 5 of fibrous material equal to the number of grooves 4 in the rubber sheet. As the rubber sheet is advanced, so are the fiber strips 5 of glass or other materials above mentioned, which are introduced into the grooves in the rubber sheet and pressed into position by a pair of pressure rolls 16 and 17. A bonding agent may be applied as by spraying lightly onto the strips 5 immediately before their insertion into the grooves, care being taken to avoid filling up the interstices between the glass fibers. Alternatively, the bonding adhesive may be applied directly to the walls of the grooves 4 before inserting the fibrous strips. As the microporous sheet 1 is rolled onto a spool 18, a liner 19 of fabric or other non-adhering material may be rolled up with the rubber sheet to prevent undesired adhesion during the vulcanizing. The roll 18 containing the unvulcanized composite sheet is then vulcanized preferably for a sufficiently long period to insure the vulcanization to hard rubber. After vulcanization, strips of the desired length may be cut from the roll to form individual separators before or after removal of the liner. Further trimming operations may be carried out if necessary.

The process described insures the formation of an integral bond between the glass fibers and the microporous rubber resulting in a composite separator. If desired, the process may be performed otherwise, as by vulcanizing the grooved microporous rubber sheet before applying the acid-resistant fibers to the grooves thereof. Other fibrous acid-resistant material may also be employed, such as asbestos, rock wool, as well as synthetic threads, for example acid amide polymers, and vinyl chloride-vinyl acetate co-polymers. Furthermore, if desired, fiber-filled grooves may be provided on both faces of the separator.

While I have shown and described a certain present preferred embodiment of my invention, it is to be understood that it may be otherwise embodied or carried out within the spirit thereof and within the scope of the appended claims.

Having thus described my invention, what I claim and desire to protect by Letters Patent is:

1. An article of manufacture consisting of an integral unitary separator and paste-retainer for storage batteries comprising the combination of a sheet of porous material including spacing means distributed over the width of the sheet and adapted to extend from one battery plate to an adjacent battery plate and to withstand compressive stresses from said plates, the sheet having grooves between the spacing means, and inert fibrous material filling the grooves to provide with said spacing means a substantially planar plate-engaging surface, the fibrous material being bonded to the porous material to form an integral separating unit.

2. An article of manufacture consisting of an integral unitary separator and paste-retainer for storage batteries comprising the combination of a sheet of porous material including spacing means distributed over the width of the sheet and adapted to extend from one battery plate to an adjacent battery plate and to withstand compressive stresses from said plates, the sheet having grooves between the spacing means, and glass fibers filling the grooves to provide with said spacing means a substantially planar plate-engaging surface, the spacing between the glass fibers being sufficient to permit a continuous body of electrolyte of substantial volume in the grooves and the fibers being bonded to the porous material to form an integral separating unit.

3. An article of manufacture consisting of an integral unitary separator and paste-retainer for storage batteries comprising the combination of a sheet of microporous rubber composition including spacing means distributed over the width of the sheet and adapted to extend from one battery plate to an adjacent battery plate and to withstand compressive stresses from said plates, the sheet having grooves between the spacing means, and inert fibrous material filling the grooves to provide with said spacing means a substantially planar plate-engaging surface, the fibrous material being bonded to the rubber to form an integral separating unit.

4. An article of manufacture consisting of an integral unitary separator and paste-retainer for storage batteries comprising the combination of a sheet of porous material including spacing means distributed over the width of the sheet and adapted to extend from one battery plate to an adjacent battery plate and to withstand compressive stresses from said plates, the sheet having grooves between the spacing means, and glass fibers filling the grooves to provide with said spacing means a substantially planar plate engaging surface, the glass being bonded to the porous material to form an integral separating unit.

GEORGE E. HULSE, Jr.